United States Patent
Aiba et al.

(10) Patent No.: US 9,547,150 B2
(45) Date of Patent: Jan. 17, 2017

(54) LENS DEVICE AND IMAGING APPARATUS

(71) Applicant: FUJIFILM Corporation, Tokyo (JP)

(72) Inventors: Daigo Aiba, Saitama (JP); Hiroshi Nakamura, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/613,385

(22) Filed: Feb. 4, 2015

(65) Prior Publication Data

US 2015/0153542 A1 Jun. 4, 2015

Related U.S. Application Data

(63) Continuation of application No. PCT/JP2013/071769, filed on Aug. 12, 2013.

(30) Foreign Application Priority Data

Sep. 26, 2012 (JP) .................................. 2012-212504

(51) Int. Cl.
*H04N 5/225* (2006.01)
*G02B 7/14* (2006.01)
(Continued)

(52) U.S. Cl.
CPC .................. *G02B 7/14* (2013.01); *G02B 7/022* (2013.01); *H04N 5/2254* (2013.01); *G03B 17/14* (2013.01)

(58) Field of Classification Search
CPC ......... H04N 5/2254; G02B 7/14; G02B 7/022; G03B 17/14
See application file for complete search history.

(56) References Cited

U.S. PATENT DOCUMENTS 5,946,516 A * 8/1999 Yoshida .................. G03B 17/14
359/827
5,976,516 A * 11/1999 Sakai ....................... A61Q 5/00
424/401

(Continued)

FOREIGN PATENT DOCUMENTS

JP 09-200586 7/1997
JP 2008-112678 5/2008

OTHER PUBLICATIONS

Kawaguchi et al, Cabling Member, Optical Apparatus, and Imaging Apparatus, 20080515, JP 5008-112678 English Translated Version.*

(Continued)

*Primary Examiner* — Twyler Haskins
*Assistant Examiner* — Carramah J Quiett
(74) *Attorney, Agent, or Firm* — Young & Thompson

(57) ABSTRACT

An object is to provide a lens device that can share a cable and can prevent the unnecessary exposure of the cable, and an imaging apparatus that includes the lens device.
A lens device according to an embodiment of the invention, which is replaceably mounted on an imaging apparatus main body, includes a lens barrel, a control unit that is provided on the lens barrel so as to protrude, a cable of which one end is connected to the control unit and the other end is connected to the imaging apparatus main body, a plurality of length regulating members that are provided in a longitudinal direction of the cable, and a housing portion in which the cable is housed and which is provided with an opening through which the cable is led out.

16 Claims, 10 Drawing Sheets

(51) Int. Cl.
*G02B 7/02* (2006.01)
*G03B 17/14* (2006.01)

(56) References Cited

U.S. PATENT DOCUMENTS

| | | | |
|---|---|---|---|
| 9,207,424 B2* | 12/2015 | Aiba | G03B 17/14 |
| 9,386,197 B2* | 7/2016 | Aiba | H04N 5/2254 |
| 2015/0124342 A1* | 5/2015 | Aiba | G03B 17/14 |
| | | | 359/830 |
| 2015/0138435 A1* | 5/2015 | Aiba | H04N 5/2254 |
| | | | 348/373 |

OTHER PUBLICATIONS

Written Opinion of the International Searching Authority PCT/JP2013/071769 dated Nov. 19, 2013.
International Search Report PCT/JP2013/071769 dated Nov. 19, 2013.

* cited by examiner

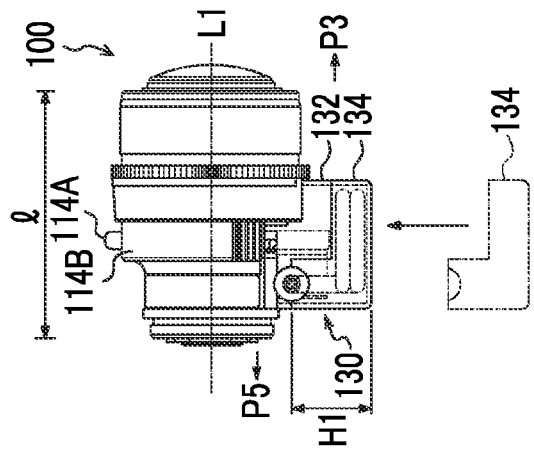
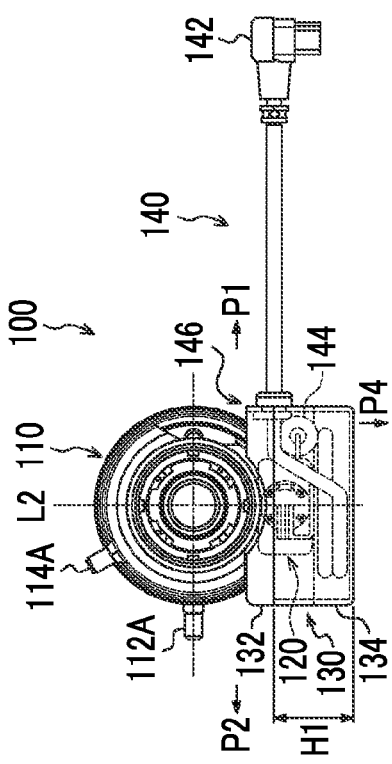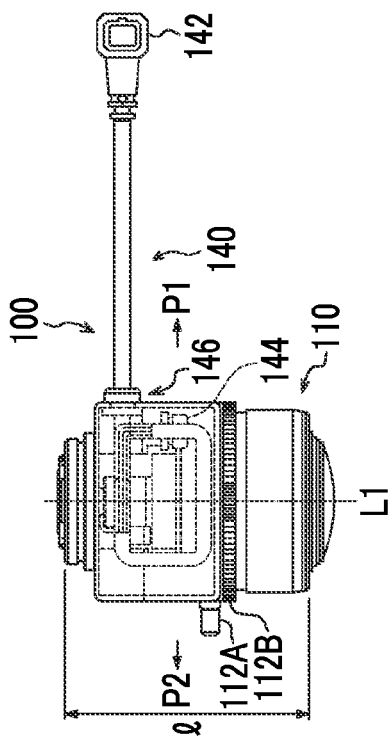

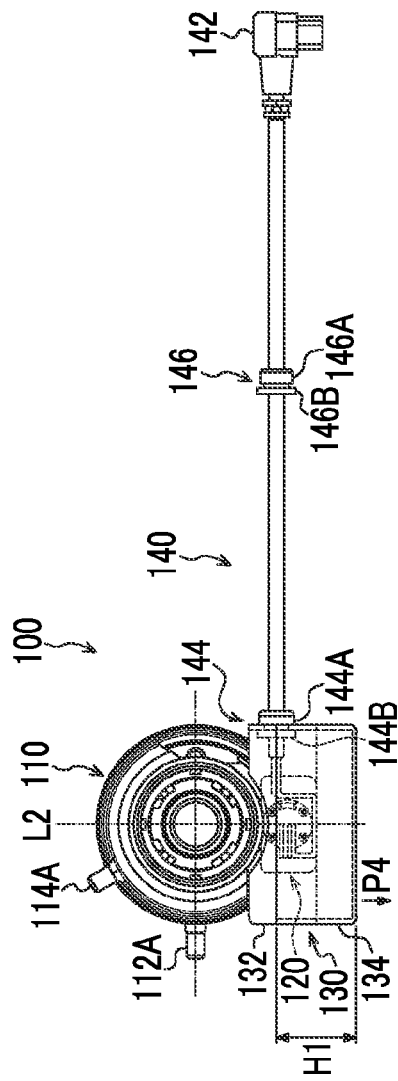
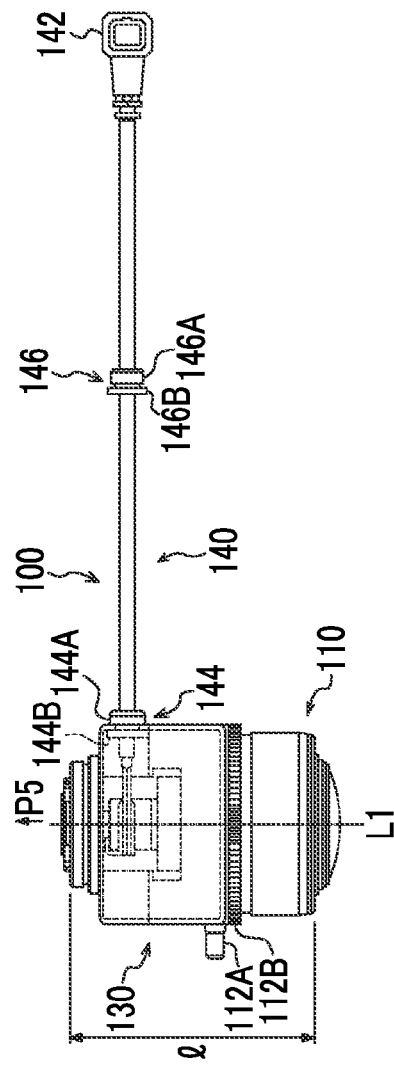

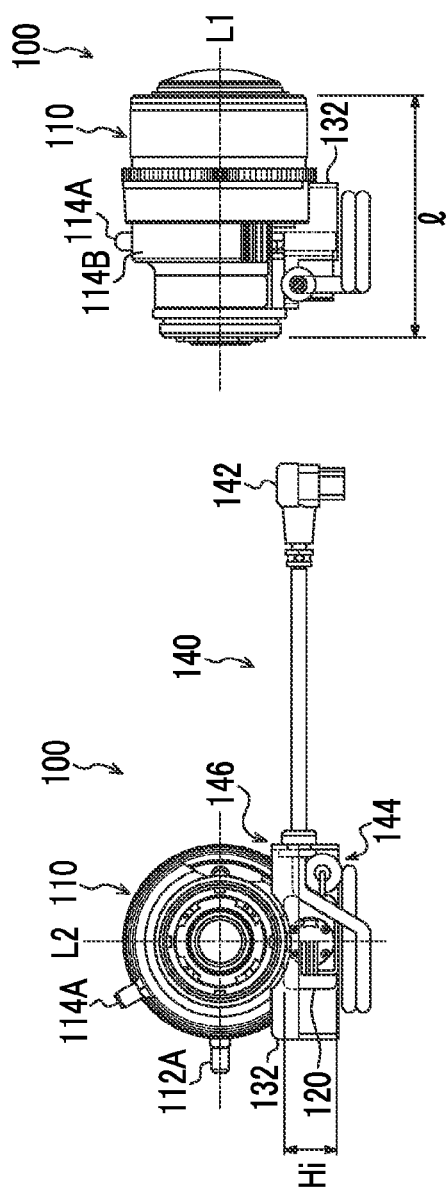
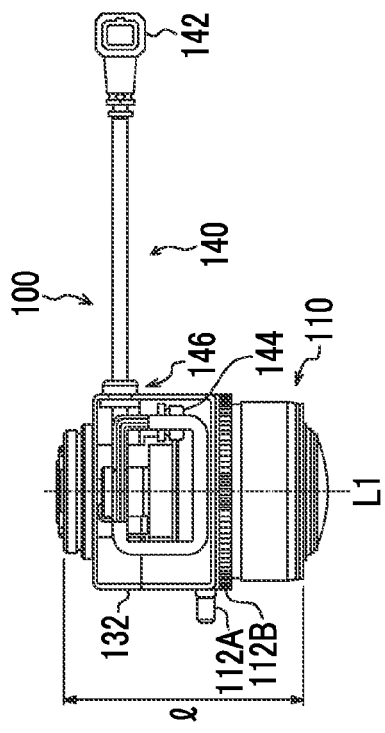
FIG. 4A  FIG. 4B  FIG. 4C

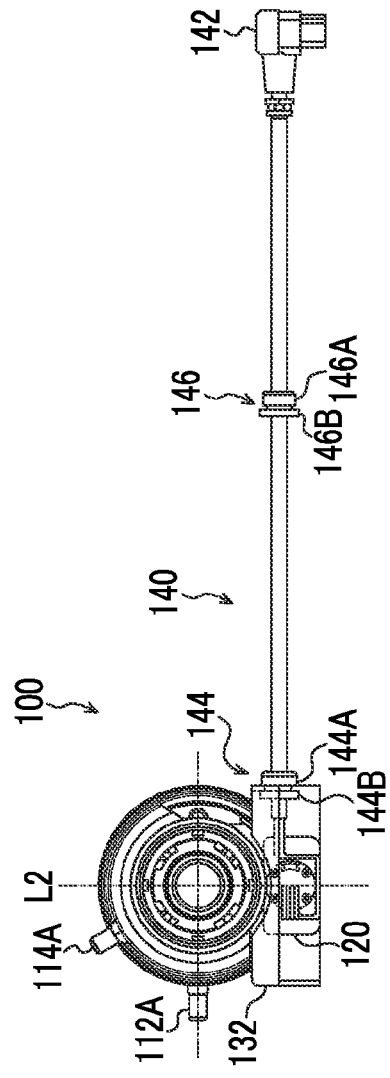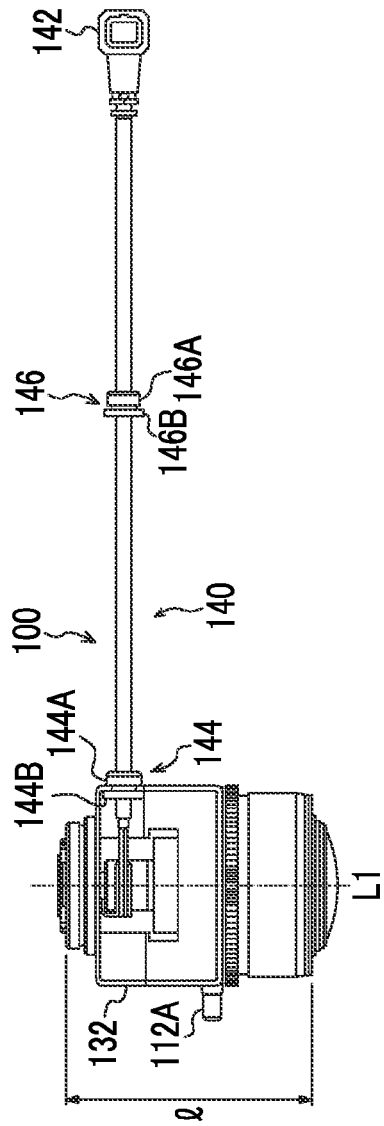

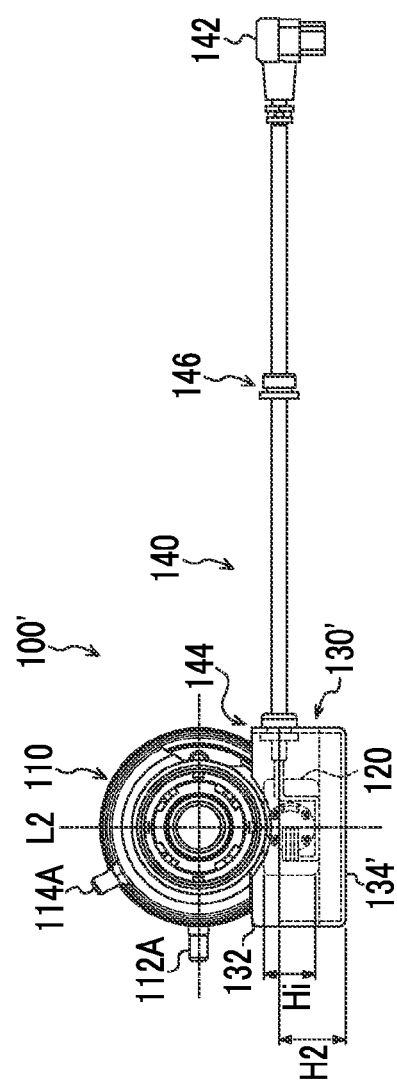
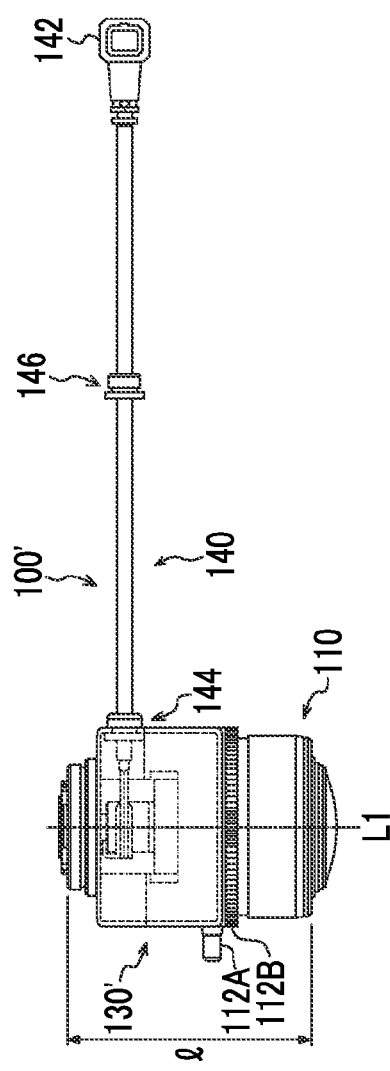

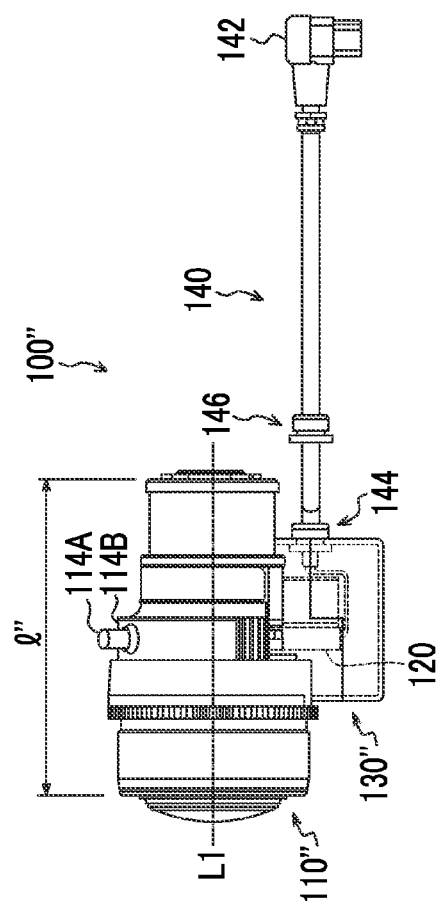
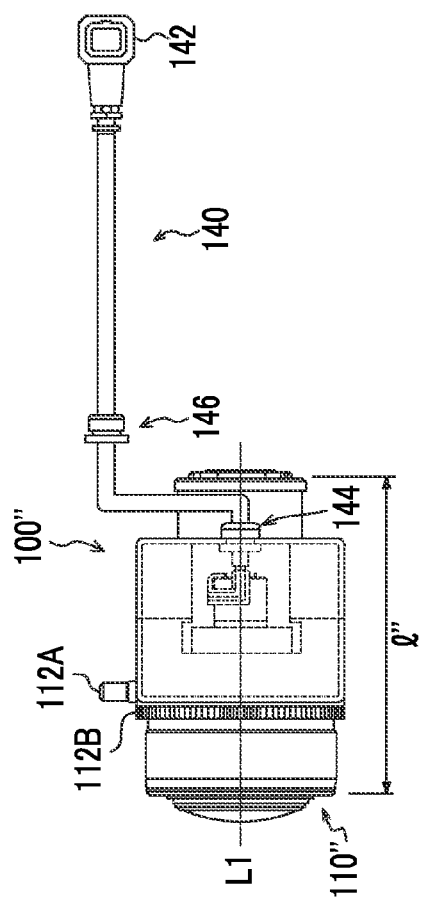

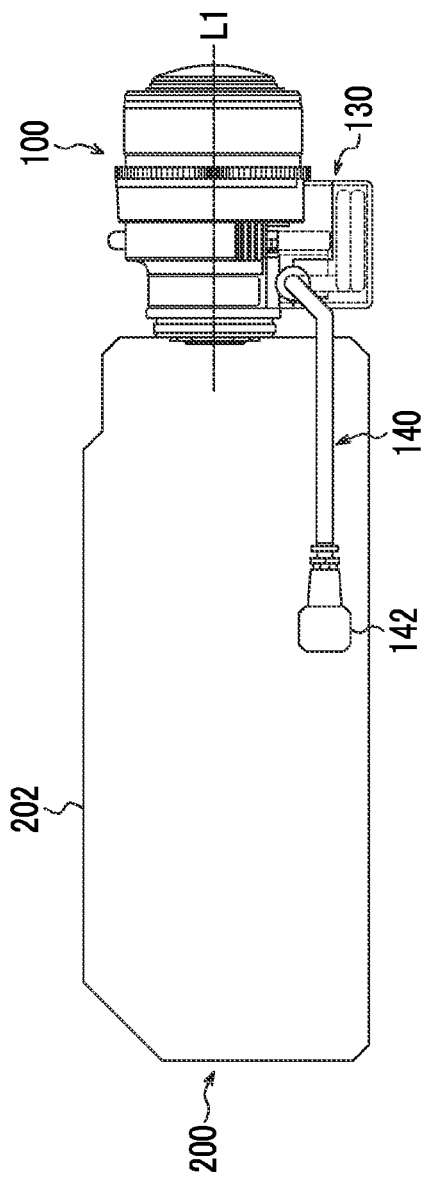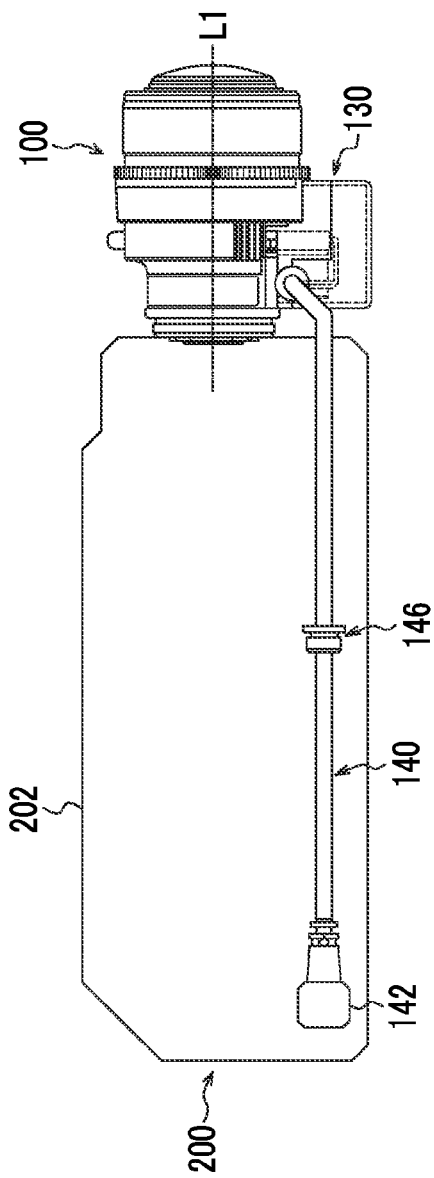

LENS DEVICE AND IMAGING APPARATUS

CROSS-REFERENCE TO RELATED APPLICATIONS

This application is a Continuation of PCT International Application No. PCT/JP2013/071769 filed on Aug. 12, 2013 which claims priority under 35 U.S.C. §119(a) to Japanese Patent Application No. 2012-212504 filed on Sep. 26, 2012. Each of the above applications is hereby expressly incorporated by reference, in its entirety, into the present application.

BACKGROUND OF THE INVENTION

1. Field of the Invention

The present invention relates to a lens device that is replaceably mounted on an imaging apparatus and an imaging apparatus on which the lens device is mounted, and more particularly, to a technique that allows a cable of a lens device to be housed.

2. Description of the Related Art

It is preferable that a lens device replaceably mounted on an imaging apparatus main body can cope with various kinds of imaging apparatus main bodies. However, there is a lens device including a cable that is provided between the lens device and the imaging apparatus main body and is used to send and receive a signal for the control of a focus, a zoom, an iris, or the like. When this type of a lens device is to be mounted on various kinds of imaging apparatus main bodies, there is a case in which the connection position of a cable varies according to the structure of the imaging apparatus main body. That is, there is a case in which the required length of a cable varies according to the structure of imaging apparatuses.

A case in which a lens device having a long cable and a lens device having a short cable are produced according to the structure of the imaging apparatus main body is considered to deal with these situations. However, since a dedicated cable is required for each model in this case, costs or inventories are increased. Further, a case in which the case of a short cable is dealt with only the lens device having a long cable is also considered. However, if the exposure or slack of a cable occurs much in an imaging apparatus such as a monitoring camera, there is a concern that the cable may be broken due to trouble and appearance is also not good. For this reason, it is preferable that the exposure of the cable be as little as possible.

Considering these points, for example, JP 997-200586A (JP-H09-20058A) discloses a monitoring camera in which the lead-out position of a cable is devised and a cover is provided at a connection portion. Furthermore, in JP2008-112678A, a mechanism for winding a cable is provided on an imaging apparatus main body so that the slack of a cable does not occur.

SUMMARY OF THE INVENTION

However, the related art disclosed in JP1997-200586A (JP-H09-200586A) and JP2008-112678A could not sufficiently deal with a request for the cable of the lens device that is caused by the structure of the imaging apparatus main body. For example, in the technique disclosed in JP1997-200586A (JP-H09-200586A), a plurality of lens devices having different cable lengths need to be prepared according to the structure of the imaging apparatus main body, and the exposure of the cables occurs for a long time when the lens devices are provided with long cables so as to correspond to a plurality of imaging apparatuses. Meanwhile, since the imaging apparatus main body is provided with a cable winding structure in the technique disclosed in JP2008-112678A, there is a problem in that the structure of the cable connection portion (a connector) of the lens device is restricted and only an imaging apparatus main body having such a specific structure can be combined and used.

The invention has been made in consideration of these circumstances, and an object of the invention is to provide a lens device that can share a cable and can prevent the unnecessary exposure of the cable. Further, an object of the invention is to provide an imaging apparatus including the lens device.

In order to achieve the above-mentioned object, according to a first aspect of the invention, there is provided a lens device that is replaceably mounted on an imaging apparatus main body. The lens device includes a lens barrel, a control unit that is provided on the lens barrel so as to protrude, a cable of which one end is connected to the control unit and an other end is connected to the imaging apparatus main body, a plurality of length regulating members that are provided in a longitudinal direction of the cable, and a housing portion in which the cable is housed and which is provided with an opening through which the cable is led out. The cable is housed in the housing portion in a plane perpendicular to a protruding direction of the control unit, and any one of the plurality of length regulating members is fitted to the opening, so that a lead-out length of the cable is changed.

Since the cable is housed in the housing portion in the first aspect, it is possible to change the lead-out length of the cable by adjusting the length of a housed portion of the cable. Accordingly, it is also possible to deal with cases in which the required length of the cable varies according to the structure of the imaging apparatus, by reducing the length of the housed portion of the cable when the lead-out length of the cable is long, conversely, by increasing the length of the housed portion of the cable when the lead-out length of the cable is short. Therefore, it is possible to appropriately use a short cable and a long cable regardless of plural kinds of cables, so that it is possible to share a cable. Further, since it is possible to adjust the lead-out length of the cable by changing the length of the housed portion of the cable, it is possible to prevent the unnecessary exposure of the cable and to prevent mischief while ensuring good appearance.

In regard to the form of the cable housed in the housing portion in the first aspect, the cable may be housed so as to be wound in a circular shape, a quadrangular shape, a spiral shape, or the like, and the cable may be housed so as to meander or be folded back. Here, the length of a wound portion, a meandering portion, or a folded portion of the cable, the number of times of the winding, meandering, and folding of the cable, and the like may be determined according to the lead-out length of the cable. Meanwhile, the "control unit" of the first aspect includes control units (for example, a motor, a galvanometer, and the like) that control a zoom lens, a focus lens, an iris and the like included in the lens device. Further, since the plurality of "length regulating members" are provided in the longitudinal direction of the cable in the first aspect, it is possible to deal with a plurality of lead-out lengths. The number of the length regulating members may be two, and may be three or more.

According to a second aspect of the invention, in the lens device according to the first aspect, the length regulating member includes two flanges between which the opening is interposed. When the length regulating member is fitted to the opening by these flanges, the lead-out length of the cable can be fixed.

According to a third aspect of the invention, in the lens device according to the first or second aspect, at least a part of the cable is wound around the control unit and a height of the control unit protruding from the lens barrel overlaps a height of the wound cable in the protruding direction. It is possible to reduce the height of the wound portion of the cable protruding from the lens barrel by winding the cable as in the third aspect. Accordingly, it is possible to reduce the size of the lens device.

According to a fourth aspect of the invention, in the lens device according to any one of the first to third aspects, the housing portion includes a cover that is detachable, and the cable housed in the housing portion is exposed to the outside when the cover is detached. Since the detachable cover is provided as in the fourth aspect, it is possible to easily change the length of the housed portion of the cable and to easily set the lead-out length of the cable. For example, it is possible to increase the lead-out length of the cable by removing the cover, stretching the cable housed in the housing portion, and leading out the cable through the opening; and to reduce the lead-out length of the cable by increasing the length of the portion of the cable housed in the housing portion.

According to a fifth aspect of the invention, in the lens device according to any one of the first to fourth aspects, a notch is formed on a marginal portion of the cover, and the notch forms the opening when the cover is mounted. It is possible to easily perform the setting of the lead-out length of the cable, which is achieved when the length regulating member is fitted to the opening, by employing the structure of the fifth aspect. Meanwhile, another notch corresponding to the notch may be formed at a main body portion of the housing portion, and the opening may be formed by these plural notches.

According to a sixth aspect of the invention, in the lens device according to any one of the first to fifth aspects, the opening is provided so that the cable is led out in a direction opposite to a direction of a visual line of the lens device. The sixth aspect is to reduce the lead-out length or the exposure length of the cable by forming an opening in a direction where the imaging apparatus main body is mounted.

According to a seventh aspect of the invention, in the lens device according to any one of the first to sixth aspects, the control unit is an iris control unit and the cable is an iris cable. Since an imaging apparatus, such as a monitoring camera, usually takes an image in a constant direction and at a constant distance, a zoom or a focus is commonly fixed when the imaging apparatus is installed. However, even in such a case, there is a lens device that is provided with an iris control unit to control the iris according to the brightness at an imaging location and the change of the brightness. The seventh aspect is to define the lens device that includes the iris control unit.

In order to achieve the above-mentioned object, according to an eighth aspect of the invention, there is provided an imaging apparatus including the lens device according to any one of the first to seventh aspects and an imaging apparatus main body on which the lens device is mounted. Since the imaging apparatus according to the eighth aspect includes the lens device according to any one of the first to seventh aspects, effects of sharing a cable and preventing the exposure of the cable by the lens devices of these aspects are obtained.

According to the lens device and the imaging apparatus of the invention, it is possible to share a cable and to prevent the unnecessary exposure of the cable as described above.

BRIEF DESCRIPTION OF THE DRAWINGS

FIGS. 1A to 1C are views showing a lens device according to an embodiment of the invention.

FIGS. 2A and 2B are views showing a state in which a cable is led out of the lens device shown in FIGS. 1A to 1C.

FIGS. 4A to 4C are views showing a state in which a cover is removed from the lens device shown in FIGS. 1A to 1C.

FIGS. 5A and 5B are views showing a state in which a cable is led out of the lens device shown in FIGS. 1A to 1C and the cover is removed from the lens device.

FIGS. 7A and 7B are views showing a state in which a cable is led out of the lens device according to another embodiment of the invention.

FIGS. 9A and 9B are views showing a state in which a cable is led out of the lens device shown in FIGS. 8A to 8C.

FIGS. 10A and 10B are views showing an imaging apparatus that includes the lens device shown in FIGS. 1A to 1C.

DESCRIPTION OF THE PREFERRED EMBODIMENTS

Embodiment of Lens Device

Structure of Lens Device

Figure 3:
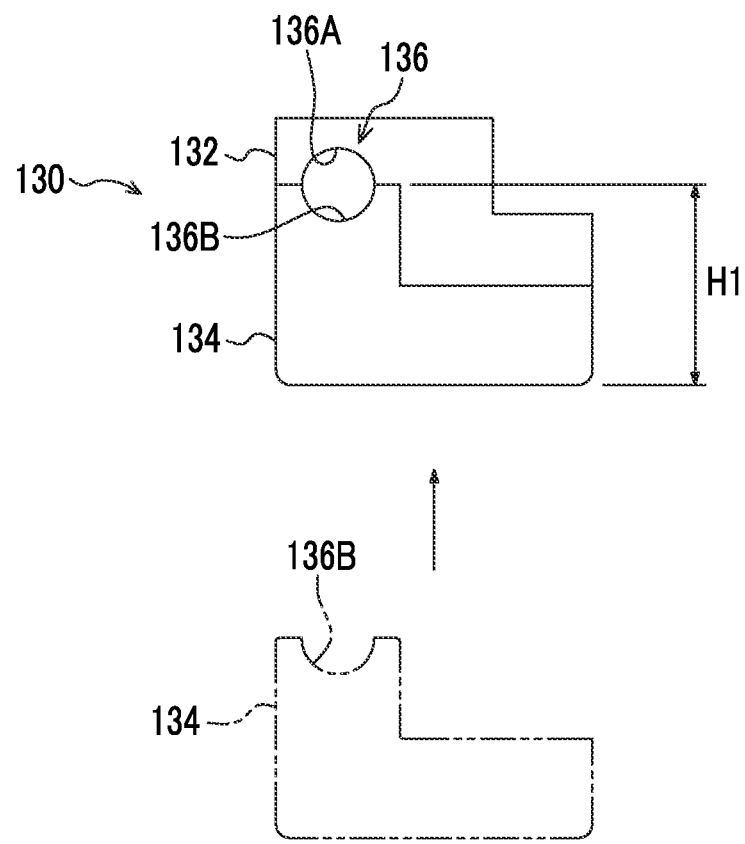
FIG. 3 is a view showing only a housing portion of the lens device shown in FIGS. 1A to 1C.
Figure 6C:
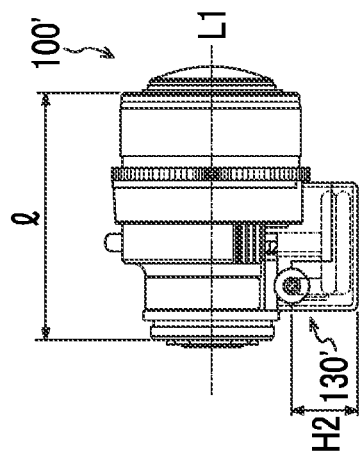
FIGS. 6A to 6C are views showing a lens device according to another embodiment of the invention in which a cable is wound around an iris meter.
Figure 6A:
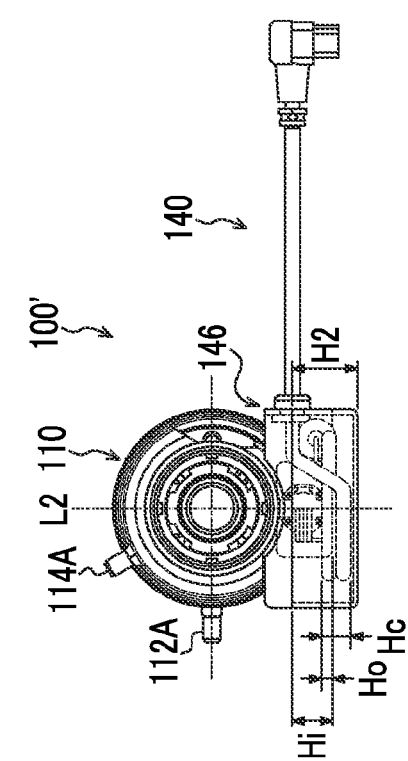
Figure 6B:
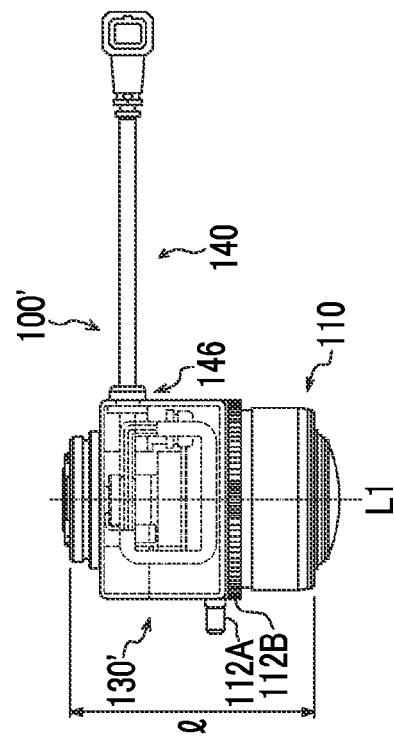

All embodiment of a lens device according to the invention will be described in detail below with reference to the accompanying drawings. FIGS. 1A to 1C are views showing a lens device 100 for a monitoring camera (a lens device) according to an embodiment of the invention. As shown in FIGS. 1A to 1C, the lens device 100 according to this embodiment includes a lens barrel 110, an iris meter 120, a housing portion 130, and an iris cable 140. The lens device 100 is replaceably mounted on a monitoring camera main body (an imaging apparatus main body) as described below, and forms a monitoring camera (an imaging apparatus).

The lens barrel 110 includes an imaging lens, a zoom lens, a focus lens, and an iris (not shown) that are provided therein. When a focus ring 112B is rotated by using a focus adjustment lever 112A, the focus lens is moved back and forth in the direction of an optical axis L1 by a mechanism, such as a cam member and a cam groove (not shown). As a result, focusing is performed. Likewise, when a zoom ring 114B is rotated by using a zoom adjustment lever 114A, a zoom lens is moved back and forth in the direction of the optical axis L1 by a mechanism, such as a cam member and a cam groove (not shown). As a result, zooming is performed.

Further, an iris meter 120 (a control unit or an iris control unit) is provided on the outer periphery of the lens barrel 110 so as to protrude in a direction L2 orthogonal to the optical axis L1. The iris meter 120 is to drive an iris (not shown).

When a connector 142 of the iris cable 140 (a cable or an iris cable) is connected to the monitoring camera main body (not shown), power and a signal are supplied to the iris meter 120 from the monitoring camera main body. As a result, the iris is driven by the iris meter 120.

A base end portion of the iris cable 140 is connected to the iris meter 120, the connector 142 is provided at a tip portion of the iris cable 140, and the connector 142 is connected to a connector (not shown) of the monitoring camera main body. Furthermore, cable bushes 144 and 146 (length regulating members) are integrally provided on the iris cable 140, and these cable bushes 144 and 146 are adapted to be fitted to an opening 136 (an opening) that is formed at the housing portion 130 (a housing portion).

The cable bush 144 is provided at the base end portion (a portion close to the iris meter 120) of the iris cable 140, and includes flanges 144A and 144B (flanges). When the cable bush 144 is fitted to the opening 136, the opening 136 is interposed between the flanges 144A and 144B and the iris cable 140 can be fixed in a state in which the lead-out length of the iris cable 140 is long. Meanwhile, the cable bush 146 is provided on a middle portion of the iris cable 140 (between the cable bush 144 and the connector 142), and includes flanges 146A and 146B. When the cable bush 146 is fitted to the opening 136, the opening 136 is interposed between the flanges 146A and 146B and the iris cable 140 can be fixed in a state in which the lead-out length of the iris cable 140 is short.

Meanwhile, the lens device according to the invention may be provided with three or more cable bushes so as to be capable of setting the lead-out length of the iris cable in three stages or more.

The housing portion 130 houses the wound iris cable 140 and protects the iris meter 120. The housing portion 130 includes a housing portion main body 132 that is fixed to the lens barrel 110 and a cover 134 (a cover) that is detachably mounted on the housing portion main body 132. Further, as shown in FIG. 3, semicircular notches 136A and 136B (notches) are formed at positions that face each other on a marginal portion of the housing portion main body 132 and a marginal portion of the cover 134, respectively. Accordingly, when the cover 134 (a height H1) is mounted on the housing portion main body 132, a circular opening 136 is formed by the notches 136A and 136B. Furthermore, the height of an inner portion of the housing portion 130 is set to a height that allows the housing portion 130 to house the iris cable 140 wound so that the lead-out length of the iris cable is reduced (that is, the iris cable 140 when the length of a wound portion of the iris cable is long and the height of the wound portion of the iris cable is large).

Adjustment of Lead-Out Length of Cable

Next, an example of the adjustment of the lead-out length of the cable in the lens device 100 having the above-mentioned structure will be described. In this example, when the lens device 100 is assembled, the iris cable 140 is wound (in a plane perpendicular to a protruding direction L2 of the iris meter 120) after the removal of the cover 134 and the cable bush 146 is fitted to the notch 136A of the housing portion main body 132. This state is shown in FIGS. 4A to 4C. Further, when the cover 134 is mounted on the housing portion main body 132 as shown in FIG. 3 in the state of FIGS. 4A to 4C, the cable bush 146 is fitted to the opening 136 formed by the notches 136A and 136B and the iris cable 140 is fixed in a state in which the lead-out length of the iris cable 140 is short. This state is a state of FIGS. 1A to 1C.

When the lead-out length of the iris cable 140 is to be increased by the structure (the position of the connector or the like) of the monitoring camera main body, the cover 134 is removed from the state of FIGS. 1A to 1C so that the state of FIGS. 4A to 4C is made. Then, the cable bush 146 is removed from the notch 136A, the cable wound in the housing portion main body 132 is stretched, and the cable bush 144 provided at the base end portion is fitted to the notch 136A. This state is a state of FIGS. 5A and 5B. After that, when the cover 134 is mounted, the cable bush 144 is fitted to the opening 136 and the iris cable 140 is fixed in a state in which the lead-out length of the iris cable 140 is long. This state is a state of FIGS. 2A and 2B.

Since the lead-out length of the iris cable 140 can be adjusted according to the structure of the monitoring camera main body in the lens device 100 according to the first embodiment as described above, it is possible to share the cable. Further, when the lead-out length of the cable is short, it is possible to suppress the exposure of the iris cable 140 to the outside of the housing portion 130 as much as possible by winding the iris cable 140 in the housing portion 130 many times.

Modification

Next, a modification of the embodiment will be described. FIGS. 6A to 6C and FIGS. 7A and 7B are views showing a lens device 100' according to this modification. Meanwhile, in the following description, the same components as the components of FIGS. 1A to 5B will be denoted by common reference numerals and the description thereof will be omitted.

The lens device 100' shown in FIGS. 6A to 6C and FIGS. 7A and 7B is different from the lens device 100 shown in FIGS. 1A to 5B in that a part of the iris cable 140 is wound around the iris meter 120. Since the iris cable 140 is wound in this way, it is possible to reduce the height of the wound iris cable 140 protruding from the lens barrel 110 and the height of a housing portion 130', which houses the wound iris cable 140, protruding from the lens barrel 110. For this reason, it is possible to reduce a height (H2) of a cover 134' by a height (Ho) where a height (Hc) of the wound portion of the iris cable overlaps a height (Hi) of the iris meter 120 (H2<H1). As a result, it is possible to reduce the size of the lens device 100'.

Like FIGS. 1A to 1C, FIGS. 6A to 6C show a state in which the iris cable 140 is wound and housed in the housing portion 130' so that the lead-out length of the iris cable 140 is short. The adjustment of the lead-out length of the iris cable 140 can be performed in the same order as described above in the lens device 100 (see FIGS. 1A to 5B). FIGS. 7A and 7B show a state in which the iris cable 140 is led out in such an order.

In the lens device 100' according to this modification, the lead-out length of the iris cable 140 can be adjusted according to the structure of the monitoring camera main body as described above as in the lens device 100 according to the above-mentioned embodiment. Accordingly, it is possible to share the cable and to suppress the exposure of the iris cable 140 as much as possible.

Second Modification

In the above-mentioned embodiment and the modification of the embodiment, the iris cables 140 have been led out to the lateral sides of the housing portions 130 and 130' (in a P1 direction of FIG. 1A). However, in the tens device according to the invention, the lead-out direction is not limited thereto, and the iris cables 140 may be led out to an opposite side (in a P2 direction of FIG. 1A) according to the structure of a monitoring camera main body to be assumed and may be led out to the front sides, the rear sides, or the lower sides of the housing portions 130 and 130' (in a P3 direction, a P4 direction, or a P5 direction of FIGS. 1A to 1C). It is preferable that the lead-out direction be set in consideration of the structure of the monitoring camera main body so that the lead-out length or the exposure length of the iris cable 140 is reduced, and it is preferable that the interference between the monitoring camera main body and the iris cable 140 be considered.

Figure 8C:
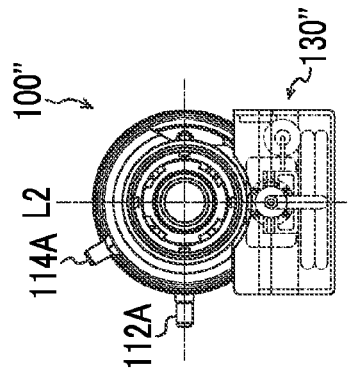
FIGS. 8A to 8C are views showing a lens device according to still another embodiment of the invention through which a cable is led out.
Figure 8A:
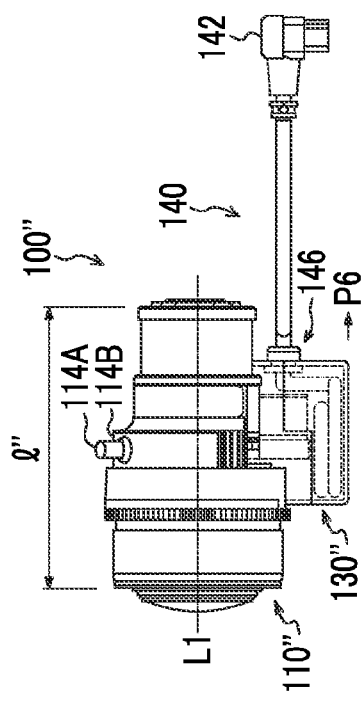
Figure 8B:
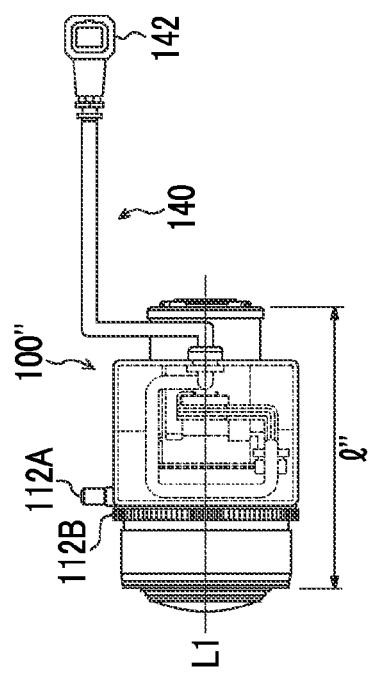

FIGS. 8A to 8C and FIGS. 9A and 9B are views showing a lens device 100'' in which an iris cable 140 is led out to the rear side of a housing portion 130''. FIGS. 8A to 8C show a state in which the iris cable 140 is wound so that the lead-out length of the iris cable 140 is reduced, and FIGS. 9A and 9B show a state in which the lead-out length of the iris cable is increased. The lens device 100'' shown in FIGS. 8A to 8C and FIGS. 9A and 9B is an example in which the length l'' of a lens barrel 110'' in the direction of an optical axis L1 is longer than the length l of each of the lens devices 100 and 100' in the direction of the optical axis L1 and an iris cable 140 does not interfere with a monitoring camera main body even when the iris cable 140 is led out to the rear side of the housing portion 130'' (in a P6 direction of FIGS. 8A to 8C) (in which a rear end of the housing portion 130 is separated from the lens barrel). Meanwhile, in FIGS. 8A to 8C and FIGS. 9A and 9B, the iris cable 140, which is led out, is formed in the shape of a crank and a connector 142 can be connected to the side surface of the monitoring camera main body. However, the shape of the iris cable 140, which is formed in the shape of a crank, may be changed so that the connector 142 is connected to the bottom of the monitoring camera main body.

Even in the lens device 100'' according to this modification, the lead-out length of the iris cable 140 can be adjusted according to the structure of the monitoring camera main body as in the lens devices 100 and 100' according to the embodiment and the modification of the embodiment. Accordingly, it is possible to share the cable and to suppress the exposure of the iris cable 140. Meanwhile, even in the lens device 100'', as in the lens device 100 and 100' shown in FIGS. 5A and 5B and FIGS. 6A to 6C, the iris cable 140 may be wound around the iris meter 120 so that the size of the lens device 100'' is reduced.

Embodiment of Imaging Apparatus

Next, an embodiment of an imaging apparatus according to the invention will be described. FIGS. 10A and 10B are views showing a monitoring camera 200 an imaging apparatus) that includes the lens device according to the embodiment of the invention. The monitoring camera 200 includes the lens device 100 according to the embodiment of the invention and a monitoring camera main body 202 (an imaging apparatus main body). The monitoring camera main body 202 includes an imaging element (a CCD, a CMOS, or the like), an image processing circuit, a recording medium, and the like that are not shown. The monitoring camera main body 202 is adapted to be capable of performing the acquisition, recording, and the like of an image. FIG. 10A shows a case in which the lead-out length of the iris cable 140 is short and the connector 142 is connected to the front portion of the monitoring camera main body 202, and corresponds to a case in which the lens device 100 is in the state shown in FIGS. 1A to 1C. Further, FIG. 10B shows a case in which the lead-out length of the iris cable 140 is long and the connector 142 is connected to the rear portion of the monitoring camera main body 202, and corresponds to a case in which the lens device 100 is in the state shown in FIGS. 2A and 2B.

As in the embodiment and the modifications of the above-mentioned lens devices 100, 100', and 100'', even in the monitoring camera 200, it is possible to adjust the lead-out length of the iris cable according to the structure of the monitoring camera main body 202 (the position of a connector) by changing the length of a wound portion of the iris cable 140. Accordingly, it is possible to share the cable and to suppress the unnecessary exposure of the iris cable. Meanwhile, the lens device 100' or 100'' may be used in the monitoring camera 200 of this embodiment instead of the lens device 100.

The invention has been described above using the embodiments, but the technical scope of the invention is not limited to the description of the embodiments. It is apparent to those skilled in the art that the embodiments can be modified or improved in various ways. It is apparent from the description of claims that embodiments modified or improved in these ways can also be included in the technical scope of the invention.

It should be noted that procedures of processing of operations, orders, steps, processes, and the like of devices, systems, programs, and methods disclosed in claims, the specification, and drawings ma be performed in an arbitrary order as long as description is not particularly made using "before", "prior to", or the like and an output of previous processing is not used in subsequent processing. Even though operating flows described in claims, the specification, and the drawings are described using "first", "next", or the like for convenience, it is not meant that the operating flows are necessarily performed in this order.

What is claimed is:

1. A lens device that is replaceably mounted on an imaging apparatus main body, the lens device comprising:
   a lens barrel;
   a control unit that is provided on the lens barrel so as to protrude;
   a cable of which one end is connected to the control unit and an other end is connected to the imaging apparatus main body;
   a plurality of length regulating members that are integrally provided on the cable spaced apart in a longitudinal direction of the cable; and
   a housing portion in which the cable is housed and which is provided with an opening through which the cable is led out, each of the plurality of length regulating members being configured to fit to the opening to resist movement of the cable through the opening,
   wherein the cable is housed in the housing portion in a plane perpendicular to a protruding direction of the control unit, and
   wherein respective different lead-out lengths of the cable from the opening are defined by of the plurality of length regulating members when fitted to the opening.

2. The lens device according to claim 1, wherein the length regulating member includes two flanges between which the opening is interposed.

3. The lens device according to claim 1, wherein at least a part of the cable is wound around the control unit, and a height of the control unit protruding from the lens barrel overlaps a height of the wound cable in the protruding direction.

4. The lens device according to claim 2, wherein at least a part of the cable is wound around the control unit, and a height of the control unit protruding from the lens barrel overlaps a height of the wound cable in the protruding direction.

5. The lens device according to claim 1, wherein the housing portion includes a cover that is detachable, and the cable housed in the housing portion is exposed to the outside when the cover is detached.

6. The lens device according to claim 2, wherein the housing portion includes a cover that is detachable, and the cable housed in the housing portion is exposed to the outside when the cover is detached.

7. The lens device according to claim 3, wherein the housing portion includes a cover that is detachable, and the cable housed in the housing portion is exposed to the outside when the cover is detached.

8. The lens device according to claim 5, wherein a notch is formed on a marginal portion of the cover, and the notch forms the opening when the cover is mounted.

9. The lens device according to claim 6, wherein a notch is formed on a marginal portion of the cover, and the notch forms the opening when the cover is mounted.

10. The lens device according to claim 7, wherein a notch is formed on a marginal portion of the cover, and the notch forms the opening when the cover is mounted.

11. The lens device according to claim 1, wherein the opening is provided so that the cable is led out in a direction opposite to a direction of a visual line of the lens device.

12. The lens device according to claim 2, wherein the opening is provided so that the cable is led out in a direction opposite to a direction of a visual line of the lens device.

13. The lens device according to claim 3, wherein the opening is provided so that the cable is led out in a direction opposite to a direction of a visual line of the lens device.

14. The lens device according to claim 4, wherein the opening is provided so that the cable is led out in a direction opposite to a direction of a visual line of the lens device.

15. The lens device according to claim 1, wherein the control unit is an iris control unit, and the cable is an iris cable.

16. An imaging apparatus comprising:
the lens device according to claim 1; and
an imaging apparatus main body on which the lens device is mounted.

* * * * *